P. W. SLAUGHTER.
FOUR-HORSE EVENERS.

No. 179,876. Patented July 18, 1876.

UNITED STATES PATENT OFFICE.

PHILIP W. SLAUGHTER, OF CANTON, ILLINOIS.

IMPROVEMENT IN FOUR-HORSE EVENERS.

Specification forming part of Letters Patent No. 179,876, dated July 18, 1876; application filed March 22, 1876.

*To all whom it may concern:*

Be it known that I, PHILIP W. SLAUGHTER, of Canton, in the county of Fulton, and in the State of Illinois, have invented a Four-Horse Draft-Evener, (in which the animals draw two before and two behind;) and I do hereby declare that the following is a full, clear, and exact description thereof, reference being had to the annexed drawings, making a part of this specification, in which like letters of reference refer to like parts, and in which—

Figure 1:
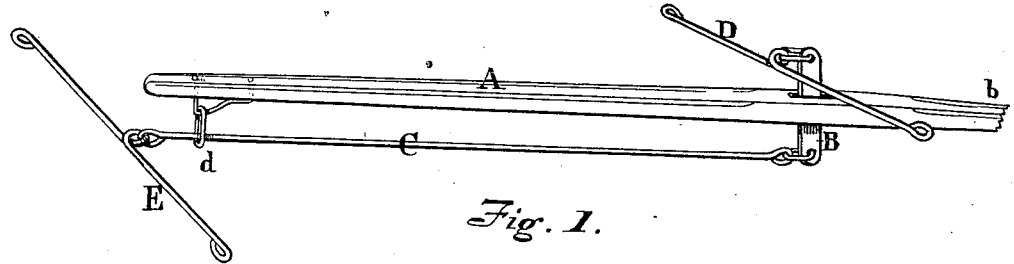
Figure 2:
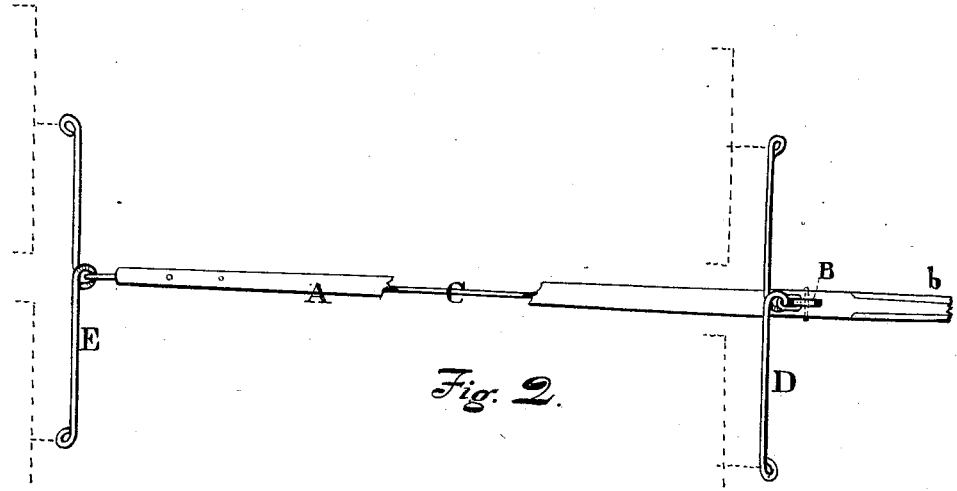
Figure 3:
Figure 4:
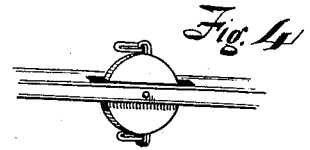

Figure 1 represents a perspective view; Fig. 2, a plan view; Fig. 3, a perspective view of another form of the "evener;" Fig. 4, another form of the same.

The object of this invention is to provide a draft-equalizer for four horses, attached or driven two abreast, adaptable either to agricultural purposes, implements, or machines, or to vehicles, &c., but more particularly useful in plowing, as the draft is more concentrated, and the animals more easily managed and guided when drawing two-and-two in pairs, one pair before the other. It consists in pivoting to the rear part of the tongue a short lever or oscillating pivoted bar, having equal arms, preferably pivoted in a vertical position in or on the sides of the tongue. To one end of this lever the double-tree for the attachment of the rear pair of horses or other animals is attached, and to the other a draft-tug, chain, or rod is attached, which extends between the said rear pair of animals to the front pair, and to which they are attached by means of the usual double-tree, single-trees, &c.

The tug or rod may be supported (as it is of some length) by means of a loop or similar device suspended from the tongue, or carried (if a rope) between friction or tension pulleys or rollers arranged along and on the tongue.

I am aware that draft-equalizers for three horses have been made with unequal arms, and pivoted to the tongue; but this present device places the draft-animals in pairs in the line of draft, thereby avoiding the uneven working of animals placed three or more abreast.

In place of a single lever I also use a disk or a semicircular plate pivoted at the center, and answering the same purpose, without departure from the principle. I also use a double-armed lever, or lever composed of parallel bars, united at their ends to each other, and embracing the tongue between them, so as to have a good side bearing on the latter, as shown in Fig. 3.

In the drawings, which represent one of the forms in which I construct this equalizer, A represents the tongue, *b* being the heel at which it is attached to a vehicle, implement, or machine—in fact, it represents any tongue used with draft-animals; B, the equalizer, pivoted at its middle to the rear of the tongue A, and to one end of which (preferably the upper end) the rear span of draft-animals is attached by means of single-trees and a double-tree, in the usual mode of attaching two horses abreast. The forward span of animals is connected with the other or lower end of said lever by means of a rod, C, running through a supporting loop or ring, *d*, pendent from the forward end of the tongue, said rod terminating in a ring or other place of attachment for a double-tree, E; D, the rear double-tree.

The operation of this equalizer is as follows: The vertical pivoting of the lever B allows a horse to travel on either side of the tongue, and the extension of the tug or rod C between the two rear horses enables the two forward animals to be placed and pull in the line of the draft and of the rear span.

What I claim as my invention is—

The combination of the extension-rod C, double-tree E, loop or ring *d*, pivotal lever B, pole A, and double-tree D, substantially as and for the purpose set forth.

In testimony that I claim the foregoing four-horse equalizer I have hereunto set my hand this 15th day of March, 1876.

PHILIP W. SLAUGHTER.

Witnesses:
 WM. D. JOHNSON,
 PHILEMON MARKLEY.